United States Patent [19]

Murofushi

[11] Patent Number: 5,251,714

[45] Date of Patent: Oct. 12, 1993

[54] METHOD FOR SOLDERING PIPE END AND COUNTER MEMBER

[75] Inventor: Kunitoshi Murofushi, Tagata, Japan

[73] Assignee: Msui Kokusai Sangyo Kaisha, Ltd., Japan

[21] Appl. No.: 396,301

[22] Filed: Aug. 18, 1989

[30] Foreign Application Priority Data

Aug. 26, 1988 [JP] Japan .................. 63-212256

[51] Int. Cl.$^5$ .................. F16L 13/08; B23K 101/04
[52] U.S. Cl. .................. 228/136; 228/173.4; 228/258; 285/22; 285/287; 285/382.4
[58] Field of Search ............. 228/173.2, 173.3, 173.4, 228/133, 134, 135, 136, 154, 258; 285/382.4, 22, 287

[56] References Cited

U.S. PATENT DOCUMENTS

| 399,720 | 3/1889 | Wolff | 285/287 |
|---|---|---|---|
| 516,372 | 5/1894 | Young | 285/287 |
| 986,164 | 3/1911 | Glennan | 385/382.4 |
| 2,033,122 | 3/1936 | Cornell Jr. | 228/246 |
| 3,100,330 | 8/1963 | Rice et al. | 228/136 |
| 3,750,248 | 8/1973 | Morris | 228/154 |
| 3,793,704 | 2/1974 | Antonevich | 228/136 |
| 3,909,045 | 9/1975 | Meagher | 285/22 |
| 4,157,153 | 6/1979 | Barnes | 228/136 |
| 4,887,557 | 12/1989 | Sukimoto et al. | 29/DIG. 4 |

FOREIGN PATENT DOCUMENTS

| 448317 | 5/1948 | Canada | 285/287 |
|---|---|---|---|
| 2285953 | 5/1976 | France | 228/154 |
| 50-9736 | 9/1971 | Japan | 228/189 |
| 54-3013 | 2/1979 | Japan | 228/154 |
| 39920 | 12/1936 | Netherlands | 228/189 |
| 289249 | 7/1968 | U.S.S.R. | 285/287 |
| 0650756 | 3/1979 | U.S.S.R. | 228/258 |
| 2092692A | 8/1982 | United Kingdom | 228/135 |

Primary Examiner—Mark Rosenbaum
Assistant Examiner—Jeanne M. Elpel
Attorney, Agent, or Firm—Anthony J. Casella; Gerald E. Hespos

[57] ABSTRACT

A method for soldering in a furnace the end of a small diameter metallic pipe to a mating member. The soldered product is generally used as an oil or air supply means for automobiles and other various kinds of machines and devices. According to the method of this invention, a larger outer diameter portion is formed at the connecting end of a pipe and forced into the inner peripheral wall of the connecting end of a mating member leaving a small clearance therebetween. Then a soldering material arranged near the the clearance is fused by heating. The method of the invention is advantageous in that upon heating, the soldering material distributes uniformly throughout the clearance between the mating walls of the connecting members thereby securely soldering both members without the necessity of tack welding.

3 Claims, 2 Drawing Sheets

METHOD FOR SOLDERING PIPE END AND COUNTER MEMBER

BACKGROUND OF THE INVENTION

1. Field of the Invention

This invention relates to a method for soldering, particularly in a furnace, the end part of a metallic pipe of a relatively small outside diameter of not more than about 30 mm laid generally in an automobile or other machine or device as a conduit for the supply of oil or air with a counter member through the medium of metallic fitting or a metallic base of a varying shape adapted as a joint.

2. Description of the Prior Art

The method heretofore employed for solding two metallic objects in a furnace has comprised inserting the connecting end part of a pipe member (P') as kept in its initial diameter into the connecting tubular wall (12) part of a counter member (11) by forcing the connecting end part into contact with the inner peripheral surface of the tubular wall or by tack welding the connecting end part and the connecting tubular wall (12) part through the operation of "clearance fit" or plasma welding, for example, as illustrated in FIG. 3, applying a soldering material to the neighborhood of the outer end peripheral part of the connecting tubular wall (12) part, and effecting mutual soldering (W') by the fusion attained as by passage through a furnace.

In accordance with the conventional method for soldering in the furnace as described above, owing to the structure of the pipe member (P') side connecting end part as kept in its initial diameter, the soldering material is not allowed sufficiently to permeate to the innermost part of the joining length while the connecting end part is pressed fast against the inner peripheral surface of the connecting tubular wall (12) part or the relative positions of the tubular member and the counter member are deviated and the soldering is attained unevenly with respect to the joining length or angle where the gap allowed for the purpose of "clearance fit" is unduly large. In the case of the tack welding as by plasma welding, the work itself is troublesome and the pipe member is liable to undergo deterioration of texture due to overheating because it has a smaller wall thickness than the connecting tubular wall. In any case, the conventional method has the problem that the pipe member side sustains cracks or fractures owing to inaccurate soldering coupled with the occurrence of vibration during the course of pipe installation.

SUMMARY OF THE INVENTION

This invention, conceived in the urge to solve the various problems of the prior art mentioned above, aims to provide a method for soldering, particularly by the use of a continuous furnace, a pipe member and a counter member, which method comprises causing the soldering material sufficiently to permeate to the innermost part of the joining length of the abutted surfaces produced by insertion or covering and, at the same time, effecting even soldering while eliminating the possible deviation of the relative positions of the pipe member and the counter member during the course of mutual attachment, thereby ensuring completion of an infallibly soldered product through formation of a clearance desirable for soldering and consequently obviating the necessity for tack welding and precluding the otherwise inevitable deterioration of texture of the matrix of the pipe member and, at the same time, enhancing the operational efficiency of both joining and soldering.

To accomplish the object described above, this invention is essentially directed to a method for soldering a pipe member and a counter member, which method comprises providing integrally the the pipe member on the connecting end part side thereof with a slightly radially expanded or contracted wall part, causing the radially expanded wall part or the radially contracted wall part of the pipe member to fit into abutting engagement with the inner peripheral surface or outer peripheral surface of a connecting wall part of the counter member side thereby allowing opposed peripheral surfaces to define a minute clearance, disposing a soldering material in the neighborhood of the clearance, and soldering the two abutted members by subjecting the soldering material to a heat treatment.

Owing to the method of soldering which is effected as described above, the minute clearance desired for the soldering, namely the optimum soldering clearance, can be defined and retained between the opposed peripheral surfaces by causing the aforementioned radially expanded wall part or radially contracted wall part to fit into abutting engagement with the inner peripheral surface or outer peripheral surface of the connecting wall part of the counter member side. Since the soldering material is allowed sufficiently to permeate into the clearance and, at the same time, solder evenly the two members held in an abutted engagement by virtue of the heat being used for the purpose of soldering. Thus, an infallibly soldered product can be obtained.

DETAILED DESCRIPTION OF PREFERRED EMBODIMENT

Figure 1A:
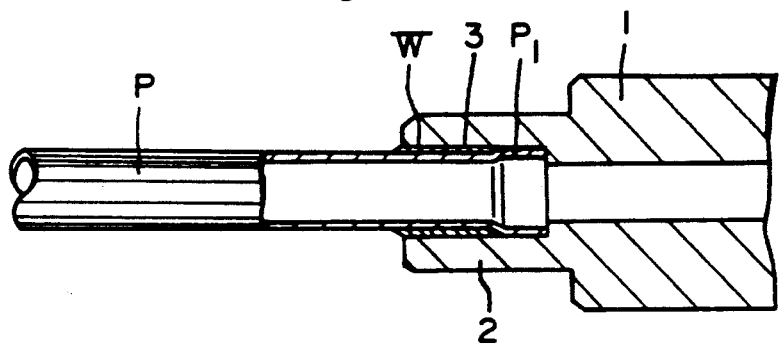
FIGS. 1 (A) and (B) are each a partially cutaway cross section illustrating the neighborhood of a connection part which is formed by the method of soldering a pipe end part and a counter member as one embodiment of this invention.
Figure 1B:
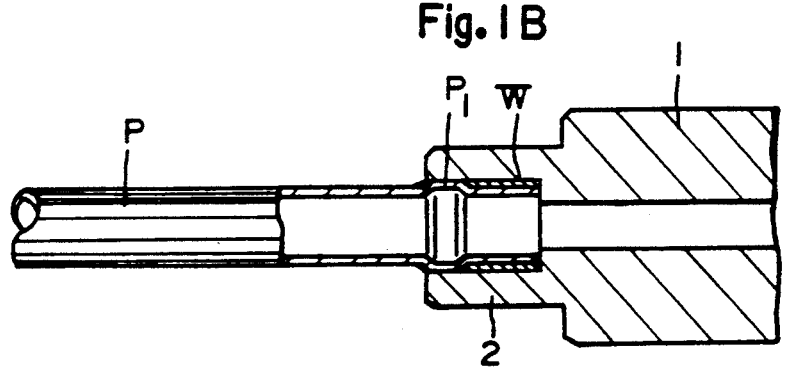
Figure 2A:
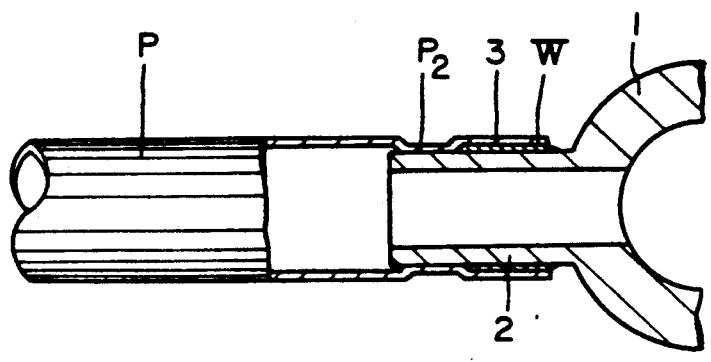
FIGS. 2 (A) and (B) are equivalents to FIGS. 1 (A) and (B) each in illustrating a structure in accordance with another embodiment of this invention.
Figure 2B:
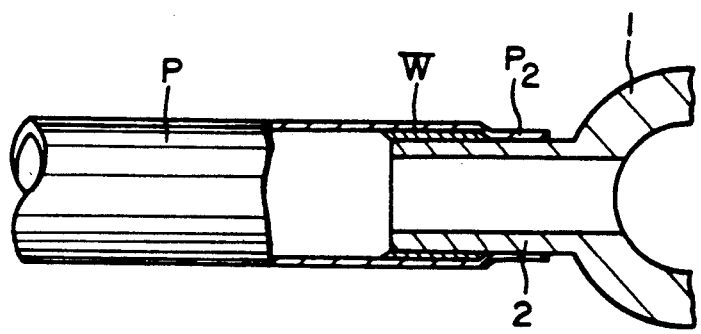
Figure 3:
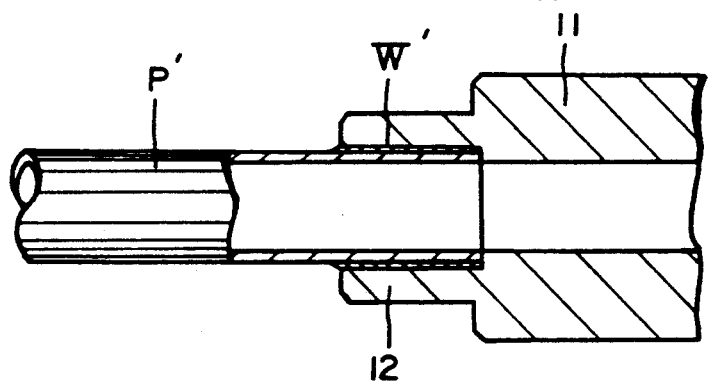
FIG. 3 is a partially cutaway cross section illustrating the neighborhood of a connecting part formed by the conventional method of soldering.

With reference to FIGS. 1 and FIGS. 2, (1) stands for a counter member consisting of a metallic end fitting or metallic base of a varying shape intended as a joint and provided projectingly thereon with a connecting wall, specifically a connecting tubular wall (2) in the illustrated embodiment, and (P) for a pipe member provided with a fitting part of a relatively small size not exceeding the diameter of the pipe mentioned above, which fitting part has integrally formed on the connecting end part side thereof a slightly radially expanded wall part (P1) (FIG. 1) or a slightly radially contracted wall part (P2) (FIG. 2) by an expanding work or a squeezing work so as to give rise to a soldering clearance generally not exceeding 0.3 mm, preferably falling in the neighborhood of 0.05 mm. When the aforementioned radially expanded wall part (P1) or radially contracted wall part (P2) is fitted into abutting engagement with the inner peripheral wall (FIG. 1) or the outer peripheral wall (FIG. 2) of the connecting tubular wall (2) part on the counter member (1) side, the peripheral surfaces which are opposed to each other as the wall parts are held in the abutting engagement define a minute clearance (3) uniformly extending in the circumferential direction and the axial direction.

Then, a soldering material of copper or brass is disposed near one of the mutually externally positioned terminal peripheral parts with the aid of a paste material or an annular wire material. The pipe member and the counter member connected to each other as described above are mounted on a gauzy belt and then passed through a furnace so as to be heated to a temperature exceeding the melting point of the soldering material. Consequently, the soldering material is melted and is allowed to solder (W) the minute clearance (3) part by virtue of the capillary phenomenon.

As described above, the method of this invention for soldering the pipe end part and the counter member in the furnace contemplates forming the soldering clearance optimum for the mutual soldering (W) by causing the slightly radially expanded wall part (P1) or radially contracted wall part (P2) formed on the pipe member (P) side to be brought into abutting engagement and consequently allowed to give rise to the minute clearance (3). Owing to this optimum soldering clearance, the soldering material is allowed sufficiently to permeate in this clearance throughout the entire length of connection attained by insertion or covering. This method has no possibility of the relative positions of the pipe member and the counter member being deviated during the course of connection and soldering. The soldering can be uniformly carried out substantially throughout the entire circumference, to give rise to an infallibly soldered product. Further, the operational efficiency of connection and soldering of the pipe member (P) can be improved. This method can obviate the necessity for tack welding and, therefore, preclude the matrix of the pipe member or the counter member from sustaining deterioration of texture due to the impact of welding. The soldering of the pipe end part and the counter member can be accomplished advantageously, particularly in a continuous furnace.

What is claimed is:

1. A method for soldering an end part of a pipe member to a counter member, said counter member having a connecting wall part, said method consisting of the steps of: first integrally forming on the end part of said pipe member an annular wall part having a different diameter from said pipe member, said annular wall part of a different diameter comprising a radial contracted wall part dimensioned to be fitted into abutting engagement with an outer peripheral surface of said connecting wall part of said counter member, said radially contracted wall part being disposed at a terminal part of said pipe member, second bringing said annular wall part into abutting engagement with the connecting wall part of said counter member, thereby causing opposed peripheral surfaces of said connecting wall part and portions of said pipe members spaced from said annular wall part to define a minute clearance of less than 0.3 mm, third disposing a soldering material near said clearance, and fourth heat treating said pipe member and said counter member to a temperature above the melting point of said soldering material and thereby causing the soldering material to permeate into the minute clearance by virtue of capillary phenomenon to mutually solder the connecting wall part of the counter member and the end part of the pipe member.

2. A method according to claim 1, wherein said minute clearance is not more than 0.05 mm.

3. A method for soldering an end part of a pipe member to a counter member, said counter member having a connecting wall part, said method consisting of the steps of: first integrally forming on the end part of said pipe member an annular wall part having a length and having a different diameter from said pipe member, said annular wall part of a different diameter comprising a radially expanded wall part dimensioned to be fitted into abutting engagement with an inner peripheral surface of said connecting wall part of the counter member, said radially expanded wall part being disposed at a position separated from the end of the pipe member by a distance equalling the length of insertion of the pipe member into the connecting wall part of the counter member minus the length of the annular wall part, second bringing said annular wall part into abutting engagement with the connecting wall part of said counter member, thereby causing opposed peripheral surfaces of said connecting wall part and portions of said pipe member spaced from said annular wall part to define a minute clearance of less than 0.3 mm, third disposing a soldering material near said clearance, and fourth heat treating said pipe member and said counter member to a temperature above the melting point of said soldering material and thereby causing the soldering material to permeate into the minute clearance by virtue of capillary phenomenon to mutually solder the connecting wall part of the counter member and the end part of the pipe member.

* * * * *

UNITED STATES PATENT AND TRADEMARK OFFICE
CERTIFICATE OF CORRECTION

PATENT NO.  : 5,251,714
DATED       : October 12, 1993
INVENTOR(S) : Kunitoshi Murofushi It is certified that error appears in the above—identified patent and that said Letters Patent is hereby corrected as shown below:

On the title page:

[73] Assignee:   Msui Kokusai Sangyo Kaisha, Ltd.,
                 Japan should read as follows:

[73] Assignee:   Usui Kokusai Sangyo Kaisha, Ltd.,
                 Japan

Signed and Sealed this

Twenty-sixth Day of April, 1994

Attest:

BRUCE LEHMAN

*Attesting Officer*    *Commissioner of Patents and Trademarks*